July 31, 1962
S. R. BROWN
3,047,812
AMPLITUDE COINCIDENCE CIRCUIT
Filed March 17, 1958
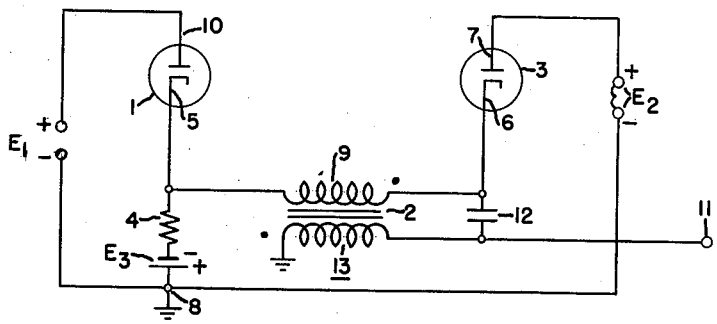
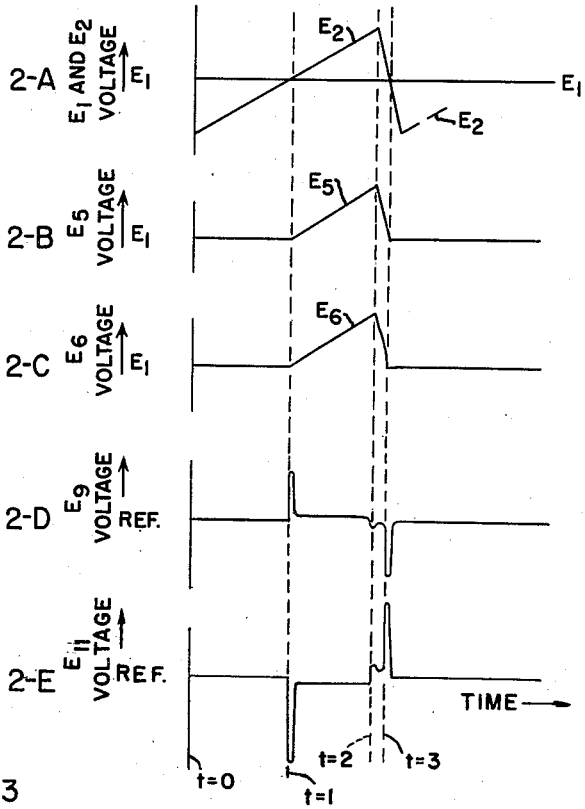
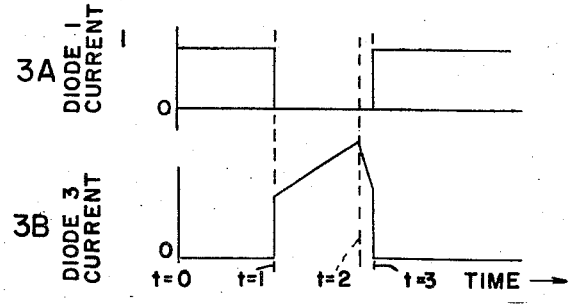
INVENTOR:
STANLEY R. BROWN,
BY
HIS ATTORNEY.

United States Patent Office 3,047,812
Patented July 31, 1962

3,047,812
AMPLITUDE COINCIDENCE CIRCUIT
Stanley R. Brown, North Syracuse, N.Y., assignor to General Electric Company, a corporation of New York
Filed Mar. 17, 1958, Ser. No. 722,032
7 Claims. (Cl. 328—147)

This invention relates to improvements in amplitude coincidence circuits, and specifically to circuits producing an output indication at the moment of amplitude coincidence between two signals whose relative amplitudes vary so that their amplitude-versus-time-plots intersect.

In electronic applications it is frequently necessary to perform an amplitude comparison operation requiring an output signal to be obtained at the time of amplitude coincidence between two signals varying in respect to each other. For example, in computer and radar circuitry it is frequently necessary to convert a signal having an amplitude proportional to a parameter magnitude to a signal having a time displacement proportional to that magnitude. Thus, a voltage whose amplitude is proportional to a time function may be compared with a voltage linearly varying with time so that upon amplitude coincidence between the two signals an output signal pulse is generated at a time interval corresponding to the time function of the input signal. Similarly such amplitude comparison might be employed where it is desired, for example, to determine the phase relationship of an A.C. signal of known maximum amplitude by comparing that signal with a reference amplitude signal whereby the output occurring at coincidence is a function of signal phase shift.

Comparison or coincidence circuits for deriving the desired output signal are known in the art but generally suffer from the inability to supply a sharply defined output at the precise time of coincidence as well as from complex circuitry and adjustments.

It is an object of the present invention to provide a novel and improved coincidence circuit which will supply a sharply defined output signal occurring rapidly upon input signal amplitude coincidence.

It is another object to provide a circuit supplying an output signal having a reference level independent from the compared signal inputs and which will provide such an output independent of any balancing or adjusting.

It is a further object of the invention to provide such a circuit having a minimum number of parts and having a minimum cost of construction.

Briefly, according to the present invention, a first signal to be compared is applied to a first series circuit including a first unidirectionally conducting device and a current limiting impedance and a second signal to be compared is applied to a second series circuit including a second unidirectionally conducting device, a reactance and the current limiting impedance so that conduction will take place only in the circuit to which the greater amplitude signal is applied, so that current flow is switched from one circuit to the other at the time of amplitude coincidence between the signals being compared. The sudden current shift through the reactance at this time generates an induced voltage pulse which provides a more precise indication of amplitude coincidence than is obtainable from comparison circuits relying on moments of current coincidence and a generally faster and sharper output pulse than is obtainable from other comparison circuits in which current flow is merely suddenly shut off or initiated at coincidence. In addition, the current flow in the comparison circuit is a direct function of the voltage difference between the signals being compared, as opposed to systems in which current flow is an indirect function, e.g. where the signal applied to an amplifier grid produces plate current flow utilized for comparison purposes. The current switching action of applicant's system therefore occurs at the exact time of amplitude coincidence without the balancing adjustments which would be required where current flow is an indirect function of applied voltage.

While the specification concludes with claims particularly pointing out and distinctly claiming the invention, it is believed that the invention will be better understood from the following description when read in connection with the accompanying drawings, in which:

FIG. 1 is a circuit diagram of a preferred embodiment of the invention; and

FIG. 2 is a series of graphs on a common time scale illustrating voltage amplitude-versus-time relations at various points in the circuit; and FIG. 3 is a similar series of graphs illustrating the magnitude of unidirectionally conducting device current flow versus time.

Referring now to FIG. 1, one of the two voltage signals to be compared, $E_1$, is applied serially across a first series circuit including a source of biasing voltage $E_3$, current limiting impedance 4 and unidirectionally conducting device 1, which is poled in the direction of easy current flow for the indicated polarity of $E_1$. Device 1 is shown in FIG. 1 as an electron tube having an anode 10 connected to a terminal of voltage source $E_1$ and a cathode 5 connected to impedance 4. The unidirectionally conducting devices may of course be either conventional electron tubes, i.e. diodes, or solid state devices. The second voltage signal to be compared, $E_2$, is applied across a second series circuit including the source of biasing voltage $E_3$, impedance 4, reactance 9, and unidirectionally conducting device 3, which is poled in the direction of easy current flow for the indicated polarity of $E_2$. Device 3 is shown in FIG. 1 as an electron tube having an anode 7 connected to a terminal of voltage source $E_2$ and a cathode 6 connected to reactance 9, whose other end is connected to cathode 5. It should be noted that impedance 4 and the source of biasing voltage $E_3$ are common to both the first and second circuit and that the biasing voltage source terminal 8, connected to $E_1$ and $E_2$ may be grounded for convenience, as indicated on FIG. 1. In the preferred embodiment of the invention reactance 9 is the primary winding of a transformer 2 and the voltage pulse generated in the reactance at the time of signal coincidence is inductively coupled to the transformer output winding 13, one of whose terminals, 11, provides the coincidence circuit output. Although a transformer provides convenient reactance and output coupling means other embodiments of the invention might utilize other means of reactance and coupling, e.g. a single reactance coil and capacitance coupling. It is important that the reactance have a high reactance to resistance ratio. The magnitude of the reactance should also be optimized for the desired amplitude and rise time of the pulse output of the coincidence circuit, since a small reactance magnitude tends to result in a sharp pulse rise time and a large magnitude tends to result in a large pulse amplitude. Additionally, it is desirable to select a reactance which will operate in an unsaturated portion of its magnetization curve.

A description of operation, which follows, requires reference to FIG. 2 which illustrates the voltage amplitude-time relations occurring at various points in the circuit in respect to grounded terminal 8. The graphs in FIG. 2 are plotted with the ordinate representing voltage amplitude, with the reference base being established at the potential reference voltage $E_1$, except for FIGS. 2–D and 2–E which have a reference base independent of voltage $E_1$. The common abscissa of the graphs represents the time relationship starting from an arbitrary zero time.

It will be assumed that voltage $E_1$ has a constant amplitude and that voltage $E_2$ is a sawtooth voltage initially varying from a negative amplitude to a positive amplitude in respect to voltage $E_1$, as shown in FIG. 2–A. The wave shapes of voltages $E_1$ and $E_2$ are of course exemplary and are taken only for the purpose of explaining one mode of system operation. Since voltage $E_2$ is assumed to have an initial amplitude lower than that of voltage $E_1$, conduction will initially occur through the first circuit including impedance 4 and device 1, as may be seen from the graph of current-vs.-time illustrated in FIG. 3–A. During conduction of device 1, its impedance is very low and as shown in FIG. 2–B its cathode voltage corresponds to the amplitude of $E_1$. Therefore, as shown in FIG. 2–C, the voltage applied, through reactance 9, to the cathode 6, of device 3 is more positive than voltage $E_2$ applied to anode 7. Device 3 is thus biased to cut off and, as shown in FIG. 3–B, no current flows through the second circuit, i.e. reactance 9 and device 3, until the amplitude of $E_2$ equals that of $E_1$. At the time of amplitude coincidence, designated as $t=1$ in FIG. 2, diode 1 is cut off, and diode 3 goes into conduction with current flow commencing through the second circuit, including reactance 9. The rapid switching of current from the first to the second circuit results in a sharp self-induced voltage being generated in reactance 9, as shown in FIG. 2–D. This voltage pulse is transformer-coupled to winding 13 and appears as a sharp voltage pulse at the coincidence circuit output 11, as shown in FIG. 2–E. The output polarity of this pulse is of course dependent upon the winding relationships between the primary and secondary windings of transformer 2. By transformer-coupling the self-generated voltage pulse of winding 9 to output 11, an output pulse is obtained whose reference base is independent of the voltages applied to the comparison device, and which is relatively unaffected by undesired voltage changes of long time duration. Other coupling means, such as capacitors, might be employed to couple the output pulse from winding 9 to the output terminal.

It should be noted here that the amplitude of the voltage pulse generated in reactance 9, and thus also of the output pulse at terminal 11, is dependent upon the amplitude of the current switched between the first and second circuits, i.e. through reactance 9, at the time of coincidence. The current magnitude of both the first and second circuits approximates the quotient of voltage applied across impedance 4 and the magnitude of impedance 4. The source of biasing voltage $E_3$, which with impedance 4 is common to both the first and second circuits, is poled so as to aid the applied signal voltages $E_1$ and $E_2$ and provide a sufficient current magnitude. Where the amplitudes of voltages $E_1$ and $E_2$ at the time of coincidence is sufficient to provide a suitable magnitude of switching current, the source of biasing voltage, $E_3$, may be omitted.

Voltage $E_2$ has been selected for purposes of circuit operation explanations so as to include not only operation with initial conduction by device 1, but also initial conduction by device 3. Thus while device 3 is in conduction, voltage $E_2$ after reaching a maximum potential at the time indicated as $t=2$ in FIG. 2, commences to decline. In view of the low conducting impedance of device 3 the voltage at cathode 6 substantially follows $E_2$, as shown in FIG. 2–C. The voltage at cathode 5 also closely corresponds to $E_2$, so that device 10 remains cut off until amplitude coincidence again occurs at the time designated as $t=3$ in FIG. 2. At this time device 3 returns to cut off and device 1 commences conduction, as shown in FIG. 3 with a resulting voltage pulse being generated in reactance 9, the pulse having a polarity opposite to that of the initially produced pulse as shown in FIG. 2–D. The signal at output terminal 11, connected to secondary winding 13 thus consists of two well defined sharp pulses, the first of one polarity at the time device 3 cuts off and the second of the other polarity at the time device 3 reassumes conduction, i.e. the times of amplitude coincidence. FIGURE 2–E illustrates a slight amplitude variation in the output voltage occurring between time $T=1$ and $t=3$, during the interval voltages $E_2$ exceeds the reference voltage. This variation due to a self-induced voltage in winding 9 because of the linearly changing current through the winding and device 3 also appears across winding 10 by transformer action, but is of minor scope and does not affect the operation of circuitry associated with the output terminals of the coincidence device.

It is possible that voltage changes applied to the anode of a cut-off device may be capacitively coupled to its cathode, thus applying such changes across winding 9 and to output terminal 11. Thus while device 3 is cut off, variations of $E_2$ may affect the output signal at 11. The extraneous voltage may be neutralized by applying a capacitance 12 from cathode 6 of device 3 to the output terminal end of winding 13 and maintaining an opposing polarity convention between windings 9 and 13, as indicated in FIG. 1.

It may also be desirable to avoid extraneous voltage spikes appearing in the voltage applied to the conducting device from appearing in the output signal, i.e., spikes in $E_2$ while device 3 is conducting. The magnitude of capacitor 12 can be selected so as to neutralize these extraneous pulses rather than the signals which are capacity-coupled through device 3.

The above described circuit is desirable because of the lack of critical circuit parameters and the lack of current or impedance balancing schemes. Furthermore, it is unnecessary to select reactance devices, i.e. transformers, having a special saturation curve, but it is indeed desirable to operate them over an unsaturated portion of the magnetization curve.

In one particular operative embodiment of the invention shown in FIG. 1, the following components were employed. These values are given for purposes of illustration only and are not to be construed as being limiting:

Devices 1 and 3_____ Type 6AL5 diodes.
Impedance 4_____ 20,000 ohm resistor.
Transformer 9_____ Fast-rise time pulse transformer type 101-1-MPT, manufactured by PCA Electronics Inc., Santa Monica, California.
$E_1$_____ +100 v.
$E_2$_____ 0 to +150 v.
$E_3$_____ −300 v.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention set forth in the appended claims. Solid state unidirectional devices may be employed in lieu of tubes and the polarity connections of both diodes may be reversed with a corresponding reversal of applied voltages.

What I claim as new and desire to secure by Letters Patent of the United States is:

1. An arrangement for determining the instant of amplitude coincidence of two voltages whose relative amplitudes vary with time, comprising: a first circuit having a first pair of input terminals for connection to a source of one of said voltages and comprising a first unidirectionally conducting device in series with an impedance, between said input terminals said device being poled to permit current flow through said impedance for one polarity of said voltage, a second circuit having a second pair of input terminals for connection to a source of the second of said voltages and comprising a second unidirectionally conducting device in series with an inductive reactance and with said impedance between said second pair of input terminals, said second device being poled to permit current flow in the same direction through said impedance for the same polarity of said second voltage, and means responsive to change in said current flow through said inductive reactance to produce a voltage pulse.

2. An arrangement for determining the instant of amplitude coincidence of two voltages whose relative amplitudes vary with time, comprising: a first circuit having a first pair of input terminals for connection to a source of one of said voltages and comprising a first unidirectionally conducting device in series with an impedance between said input terminals, said device being poled to permit current flow through said impedance for one polarity of said voltage, a second circuit having a second pair of input terminals for connection to a source of the second of said voltages and comprising a second unidirectionally conducting device in series with an inductive reactance and with said impedance between said second pair of input terminals, said second device being poled to permit current flow in the same direction through said impedance for the same polarity of said second voltage, means for biasing said first and second devices in a direction tending to cause current flow in said first and second circuits, and means responsive to change in said current flow through said inductive reactance to produce a voltage pulse.

3. In an arrangement for determining amplitude coincidence between a plurality of voltages varying such that their amplitude versus time plots intersect, a plurality of potential sources, each source having a pair of terminals, a plurality of unidirectionally conducting devices each having a pair of terminals of unlike polarities, an impedance, means coupling a first of said devices in series with said impedance and in the direction of easy current flow between the terminals of a first of said sources, an inductive reactance coupled between the junction of said first impedance and said first device and a terminal of a second of said devices, the terminals of said first and said second devices between which said reactance is coupled being of like polarity, and means coupling a second of said sources between the remaining terminal of said second device and the terminal of said impedance coupled to said first source, output means operatively associated with said inductive reactance adapted to supply a voltage pulse occurring at the time of amplitude coincidence between the voltages of said first and second source.

4. In an arrangement for determining amplitude coincidence between a first and a second voltage varying such that their amplitude versus time plots intersect, a first and second pair of terminals adapted to be connected respectively to the source of said first and second voltage, a first and a second unidirectionally conducting device each having a pair of terminals of unlike polarities, a first impedance, said first device connected in series with said first impedance and in the direction of easy current flow between said first pair of terminals, an inductive reactance coupled between the junction of said first impedance and said first unidirectional device and a terminal of said second unidirectional device, the terminals of said unidirectional devices between which said inductive reactance is connected being of like polarity, and said second pair of terminals connected between the remaining terminal of said second unidirectional device and the terminal of said first impedance coupled to one of said first pair of terminals, output means inductively coupled with said inductive reactance adapted to supply a voltage pulse occurring at the time of amplitude coincidence between said first and second voltage.

5. In the arrangement of claim 4, capacitive means coupled from the junction of said reactance and said second device to said inductively coupled output means, so as to neutralize undesirable signal variations coupled from said remaining terminal of said second device.

6. In an arrangement for determining amplitude coincidence between a first and a second voltage varying such that their amplitude versus time plots intersect, a first and second source of potential each source having a pair of terminals, a first and a second diode each having a pair of terminals of unlike polarities, a resistance, said first diode connected in series with said resistance and in the direction of each current flow between said terminals of said first source, a transformer having a primary and a secondary winding, said primary winding connected between the junction of said resistance and said first diode and a terminal of said second diode, the terminals of said diodes between which said primary winding is connected being of like polarity, said second source connected between the remaining terminal of said second diode and the terminal of said resistance connected to said first source, the secondary winding of said transformer supplying a voltage output pulse occurring at the time of amplitude coincidence between the voltage of said first and second source.

7. A coincidence circuit comprising a first and second unidirectional device each having at least an anode and a cathode, a transformer having a primary and a secondary winding, said primary winding connected between the cathodes of said first and second unidirectional devices, a current limiting impedance having two terminals, one of said terminals being connected to the cathode of said first device, a first voltage applied to the anode of said first device, a second voltage varying with said first voltage such that their amplitudes coincide at some time, said second voltage being applied to the anode of said second device, a third voltage negative in respect to said first and second voltage at the time of amplitude coincidence, said third voltage being connected to the other of said terminals of said impedance, said first, second and third voltages being referenced to a common potential, said secondary winding of the transformer connected to supply an output pulse occurring at the time of amplitude coincidence between said first and second voltages.

References Cited in the file of this patent

UNITED STATES PATENTS

| | | |
|---|---|---|
| 2,473,457 | Tyson | June 14, 1949 |
| 2,555,440 | Gilbert | June 5, 1951 |
| 2,676,253 | Ayres | Apr. 20, 1954 |
| 2,736,878 | Bayle | Feb. 28, 1956 |
| 2,849,606 | Parker et al. | Aug. 26, 1958 |
| 2,858,438 | Merrill | Oct. 28, 1958 |

OTHER REFERENCES

Radio Engineering by Terman, page 228, McGraw-Hill, 1947.

"Pulse-Former" by Louis E. Garner, Jr., in August 1951, Radio and Television News, page 57.

"Introductory Circuit Theory" by E. A. Guillemin, John Wiley and Sons, 1953, page 258 relied on.

"Electronic and Radio Engineering" by F. E. Terman, McGraw-Hill Book Co., 1955, page 601 relied on.